United States Patent [19]
Hollensbe

[11] Patent Number: 5,778,553
[45] Date of Patent: Jul. 14, 1998

[54] DIMENSION TRANSFER TOOL

[76] Inventor: Homer D. Hollensbe, P.O. Box 1701, Bailey, Colo. 80421

[21] Appl. No.: 675,591

[22] Filed: Jul. 3, 1996

[51] Int. Cl.[6] .................................................. G01B 5/14
[52] U.S. Cl. .................................................. 33/810; 33/536
[58] Field of Search .................... 33/536, 537, 810, 33/811, 812, 567, 567.1

[56] References Cited

U.S. PATENT DOCUMENTS

| | | | |
|---|---|---|---|
| 695,661 | 3/1902 | Theibault | 33/810 |
| 1,786,325 | 12/1930 | Young | 33/810 |
| 2,489,733 | 11/1949 | Ullman | 33/536 |
| 3,562,773 | 2/1971 | Wilamowski | 33/812 |
| 4,744,152 | 5/1988 | Roach et al. | 33/536 |

FOREIGN PATENT DOCUMENTS

| | | | |
|---|---|---|---|
| 374896 | 1/1940 | Italy | 33/810 |
| 573862 | 12/1945 | United Kingdom | 33/812 |
| 2242747 | 10/1991 | United Kingdom | 33/810 |

*Primary Examiner*—Thomas B. Will
*Attorney, Agent, or Firm*—Ramon L. Pizarro; Edwin H. Crabtree

[57] ABSTRACT

A feature dimension transfer tool which includes a longitudinal body with a longitudinal axis and a flat surface, a first cylinder with a longitudinal axis, the first cylinder being attached next to the flat surface of the longitudinal body and the longitudinal axis of the first cylinder being substantially parallel to the flat surface of the longitudinal body and substantially perpendicular to the longitudinal axis of the longitudinal body. A carriage is slideably mounted on the longitudinal body and a second cylinder with a longitudinal axis is mounted on the carriage, next to the flat surface of the longitudinal body. The longitudinal axis of the first cylinder is substantially parallel to the flat surface of the longitudinal body and substantially perpendicular to the longitudinal axis of the longitudinal body. The device serves to measure the dimension of a feature on a workpiece by allowing the user to place the flat surface of the longitudinal body over the feature to measured and then bringing the cylinders into contact with the surfaces next to the feature to be measured. The dimension of the feature may then be calculated by using the tangential relationship of the cylinders and the flat surface of the longitudinal body.

14 Claims, 3 Drawing Sheets

5,778,553

DIMENSION TRANSFER TOOL

BACKGROUND OF THE INVENTION

(a) Field of the Invention

This invention generally relates to field of tools used in taking measurements, and more particularly, but not by way of limitation, to a caliper that takes advantage of tangential relationships to measure features on machined parts.

(b) Discussion of the Prior Art

The machining of tooling and molds typically requires the use of high precision machining processes and highly skilled craftsmen to produce molds and tools according to specification. For high volume production runs one may manufacture these tools or molds by using numerically controlled machining equipment. For small production runs, or custom tool and mold manufacturing one typically resorts to the use of a highly skilled craftsman using traditional equipment such as lathes and mills.

The task of the craftsman, or machinist, is to read the blueprints or drawings defining the tool or mold to be made and then produce an article that meets the specifications of the drawing. Thus the machinist must transform a workpiece, which typically begins as a simple piece of metal, into the specified tool or mold. To carry out this task the machinist must machine the workpiece and regularly compare the dimensions of the workpiece to the dimensions specified in the drawing.

The task of measuring and comparing the dimensions of the workpiece to the specifications is complicated by the precision of the required measurements and the fact that the workpiece is usually mounted on a jig or fixture which holds the workpiece at a known relationship relative to the tool being used to shape the workpiece. The known prior art includes various examples of approaches at providing measuring devices for precision machining of tools and the like. These devices include micrometers and calipers which include precision movements to measure the features of a workpiece. Other tools used for measuring include devices such as tangent blocks, sine bars, and pins which have known dimensions and tolerances which are used to determine the dimensions of the features of the workpiece.

However, most measuring or comparison type tools have the serious drawback that they require that the workpiece be removed from the jig or fixture that is holding the workpiece in order to measure or gage the features of the workpiece. This introduces difficulties in achieving the same setup position after the measurement is taken. Moreover, the tearing down and setup of the tooling and workpiece takes up time and reduces productivity. Still further, workpieces with somewhat difficult to measure features require the use of several measurements with the use of several tools, such as sine bars and pins of known dimensions.

Approaches at producing tools that can be used to measure a variety of complicated geometries include U.S. Pat. No. 4,777,731 to Favvas. The Favvas device teaches the use of a taper measuring device and method. The device includes a long body with spheres of known diameter at its ends and stabilizing discs near the ends of the body.

Another example includes U.S. Pat. No. 2,943,349 to Schabot which teaches the use of a tapered hole gauge with a pair of collars with spheres for measuring between tapered surfaces. The collars of the Schabot device ride on a shaft with a circular cross section except for a flat area extending along the shaft. Each of the collars has a sphere and a flat portion that is designed to remain parallel to a line between the centers of the spheres. The Schabot device provides the important advantage of serving as a measuring gage or dimension transfer tool which does not require the removal of the workpiece from the jig or tool holding the workpiece in order to measure the workpiece.

However, the Schabot device suffers from the disadvantages suffered by all gages which use spheres for contacting the workpiece. Perhaps the most significant disadvantage of these devices is that the spheres allow the user to take a measurement along a diagonal line across the feature to be measured. Thus, the machinist may make an erroneous measurement which indicates that the feature is larger than it actually is. Accordingly, this measurement will prompt the machinist to remove material from the workpiece, and leading to a defect that is very difficult to correct since it is easy to remove material but very difficult to properly add material back on to the workpiece. Therefore, in order to obviate problems devices which contact the workpiece with spheres should be used only while measuring round holes.

Another measuring device, U.S. Pat. No. 2,825,975 to Cameron et al., teaches the use of a pair of collars with spheres for measuring between tapered surfaces. The collars include a flat surface to which the spheres are tangentially attached. The collars also include an aperture therethrough to accept a rod that supports the collars. The Cameron invention uses the dimensional characteristics of tangent elements to allow the user to determine the dimension of surfaces between converging or diverging surfaces. However, as stated above, the use of spheres on collars is a highly disadvantaged method for measuring surfaces since these devices give the user no indication as to whether the measurement is being taken diagonally over the feature.

Yet another disadvantage of both the Schabot device and the Cameron device is that they offer no depth measurement capabilities. The absence of this feature requires that the machinist carry tools which can perform the important function of depth measurement.

Other measuring devices including U.S. Pat. No. 2,246,066 to Rothe, U.S. Pat. No. 2,494,715 to Mathews, and U.S. Pat. No. 2,178,293 to Wogeck use spheres to contact the workpiece to be measured. Theses devices still suffer from the limitations of other known measuring devices which use the tangent contact of a sphere to determine the length of a feature. The primary disadvantage being that spheres do not prevent the user from making diagonal, erroneous, measurements. One approach at reducing problems with inadvertently making diagonal measurements is taught in U.S. Pat. No. 2,431,826 to Pozar, which teaches a dovetail measuring device which includes spheres on slideable collars and flush plates to secure the orientation of the tool. However, this approach requires that the workpiece have a feature that may be engaged by the flush plates, and thus may not be very useful in aiding measurements taken at the middle of a large workpiece.

In yet another device, U.S. Pat. No. 2,746,158 to Gershman a measuring tool which uses a roll which is used to maintain a fixed relationship with a sine bar is used to measure tapers. This tool, however, is limited in that it is designed to serve very narrow purpose of measuring tapers.

Thus there remains a need for a measuring apparatus that can be used to accurately measure a variety of complex features on a work piece.

There remains a need for a device that solves the problem of requiring removal of the workpiece from the jig or fixture that holds the workpiece in front of the machining tool.

There remains a need for a dimension transfer tool, or measuring device, which can be used to guide the dimension of features on complex workpieces. Also, there remains a need for a tool which can be used to measure depths as well as lengths.

There remains a need for a measuring tool that is not susceptible to allowing the user to make erroneous measurements by measuring diagonally over a feature.

SUMMARY

It has been discovered that the above problems, which had been left unsolved by the known prior art, can be solved by providing a feature dimension transfer tool which includes:

a) a longitudinal body with a longitudinal axis and a flat surface;

b) a first cylinder with a longitudinal axis, the first cylinder being attached next to the flat surface of the longitudinal body and the longitudinal axis of the first cylinder being substantially parallel to the flat surface of the longitudinal body and substantially perpendicular to the longitudinal axis of the longitudinal body;

c) a carriage slideably mounted on the longitudinal body;

d) a second cylinder with a longitudinal axis, the second cylinder being mounted on the carriage and next to the flat surface of the longitudinal body, the longitudinal axis of the first cylinder being substantially parallel to the flat surface of the longitudinal body and substantially perpendicular to the longitudinal axis of the longitudinal body.

In a preferred embodiment of the feature dimension transfer tool the first cylinder is fixedly attached to the body, so that measurements of features may be made by placing the first cylinder against a surface that intersects the surface to be measured and the second cylinder against another surface which intersects the surface to be measured. Thus, one may bring the second cylinder against a surface that intersects the surface that is to measured by simply sliding the carriage along the longitudinal body.

For example, to measure the dimension of a surface which is between two other surfaces that are at known angles to the surface to be measured, the first cylinder and the second cylinder will placed against the two surfaces which are adjacent to the surface to be measured, and the flat surface of the longitudinal body will lie flat over the surface to be measured. Since the angle of the adjacent surfaces is known, one may use the fact that the angle between the tangent point of the cylinders and the flat surface of the longitudinal body will be the same as the angle of the surface that adjoins the surface to be measured. Therefore by measuring the distance between the cylinders one may determine the length of the surface to be measured by subtracting the radius of each of the cylinders divided by the tangent of one half the angle between the adjoining surface and the flat surface of the longitudinal body from the distance between the centers of the cylinders.

Alternatively, the user of the instant invention may a micrometer to measure across, over the two cylinders, and then subtract from this measurement the result of dividing the radius of each cylinder by the tangent of one half of the angle of the surface, minus the diameter of the cylinders. Naturally, it is contemplated that these calculations may be tabulated or simply carried out by microprocessor which can be combined with vernier or magnetic markings on the longitudinal body to calculate and present a digital readout of the dimension of the feature to be measured. Thus, while the dimension transfer tool can serve as an indirect measuring tool, it can be easily modified to produce a direct measurement tool.

In a preferred embodiment of the feature dimension transfer tool a third cylinder mounted at an end of the longitudinal body in a position that is substantially parallel to the second cylinder and that results in the second cylinder being between the third cylinder and the first cylinder. This arrangement provides versatility to the tool by allowing the user to make depth measurements with the tool.

To make a depth measurement with the tool one would insert the end of the tool with the third cylinder down, along the surface whose depth is to be measured, until the third cylinder rests against a surface that intersects the surface to be measured. While the flat portion of the longitudinal body is pressed against the surface to be measured, the second cylinder is slid against a surface that intersects the surface to be measured at an edge that is opposite to an edge next to the third cylinder. Thus, with this arrangement the depth of the feature to be measured can be calculated from distance between the second cylinder and the third cylinder.

Moreover, in a preferred embodiment of the feature dimension transfer tool a first sphere is mounted on the longitudinal body at a location opposite to the flat surface on the longitudinal body, and a second sphere mounted on the carriage at a position opposite the flat surface on the longitudinal body. Preferably, the first sphere is mounted opposite to the first cylinder, and the second sphere is mounted opposite to the second cylinder. With this arrangement one may use the spheres to gage the size of an orifice.

Still further, a teardrop shaped aperture is preferably incorporated into the longitudinal body, near the end having the third cylinder. The inclusion of this teardrop shaped aperture allows the use of the tool together with tooling pins to gage a distance from a tooling pin. Also, the teardrop aperture may be used to support a dial indicator, and thus the tool can reduce the number of tools to be carried by the machinist.

According to another aspect of the invention, a method for measuring a feature on a machined article where the feature to be measured lies between a first surface and a second surface. The method for measuring consists of the following steps:

a) providing dimension measuring tool having:
   a longitudinal body having a longitudinal axis, a first end and a second end, and a flat surface;
   a first cylinder having a longitudinal axis, the first cylinder being attached next to the flat surface of the longitudinal body and the longitudinal axis of the first cylinder being substantially parallel to the flat surface of the longitudinal body and substantially perpendicular to the longitudinal axis of the longitudinal body;
   a carriage slideably mounted on the longitudinal body;
   a second cylinder having a longitudinal axis, the second cylinder being mounted on the carriage and next to the flat surface of the longitudinal body, the longitudinal axis of the first cylinder being substantially parallel to the flat surface of the longitudinal body and substantially perpendicular to the longitudinal axis of the longitudinal body;

b) placing the flat surface of the longitudinal body over a feature to be measured;

c) contacting the first surface with the first cylinder;

d) sliding the carriage on the longitudinal body until the second cylinder is pressed against the second surface; and e) measuring the distance between the first cylinder and the second cylinder.

Therefore, with this summary it will become apparent that the disclosed invention solves problems inherent to measuring tools which use spheres to contact surfaces that are on the sides of the feature to be gaged. The problems associated with ensuring that the body of the gage is placed over the feature to be measured in a position that ensures true measurement, instead of measurement along a diagonal path, have been solved by providing a measuring tool that includes a pair of cylinders with their longitudinal axes being perpendicular to the length of the feature to be measured.

Also, it will become apparent to those skilled in the art that the disclosed invention provides versatility in the kinds of features that can be accurately measured. Thus, the instant invention produces new, useful, results in reducing the number of tools that must be purchased and carried by the machinist.

Further, it can be appreciated that the instant invention provides a simple tool which can be used in conjunction with other tools, such as gage blocks and tooling pins, to gage surfaces on complicated machined parts.

Still further, it will be appreciated that the instant invention solves the problems associated requiring the machinist to remove his workpiece in order to determine the dimension of a particular feature being machined.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
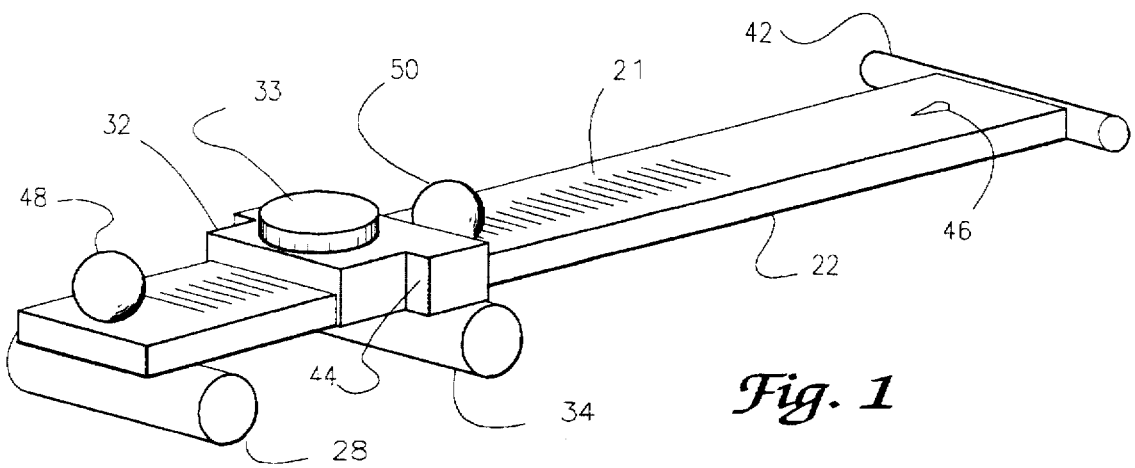
FIG. 1 is a perspective view of a preferred embodiment of a feature dimension transfer tool made in accordance with the principles taught herein.

Shown in FIG. 1 is a perspective view of a preferred embodiment of a feature dimension transfer tool 20. It should be noted that the instant invention is referred to herein as a feature dimension transfer tool 20 since in its preferred embodiment, the tool serves as a means for indirect measurement. Thus in its preferred embodiment the feature dimension transfer tool 20 allows the user to record or gage the dimension of a feature, and then a measurement of the feature may be made by measuring the dimension recorded or gaged with the tool by means of a micrometer, for example. Thus, the in the contemplated preferred embodiment, the tool is used to gage and transfer the dimension of a feature to a direct measuring device. It should be noted, however, that it is contemplated that the invention may include means, such as a vernier scale, graduations 21 or an electronic processor and readout, which allow the user to make direct reading on the tool.

As shown in FIG. 1, it can be seen that the feature dimension transfer tool 20, which is preferably made of a hardened steel or other suitable dimensionally stable material, includes a longitudinal body 22 with a longitudinal axis 24 and a flat surface 26. Attached to the longitudinal body 22 is a first cylinder 28 having a longitudinal axis 30. Also mounted on the longitudinal body 22 is a carriage 32, which is slideably mounted on the longitudinal body 22. The position of the carriage 32 along the longitudinal body 22 being retainable by means of a locking wheel 33 which includes a setscrew portion that engages the longitudinal body 22. It can be appreciated that for ease of manufacture, and for ease in mating the longitudinal body 22 with the carriage 22, it is advantageous to fabricate the longitudinal body 22 with a generally rectangular cross-section.

On the carriage 32 is mounted a second cylinder 34. The second cylinder 34 includes a longitudinal axis 36 which should remain substantially parallel to the flat surface 26 of the longitudinal body 22 and substantially perpendicular to the longitudinal axis 24 of the longitudinal body 22. While the first cylinder 28 and the second cylinder 34 have been shown as being of the same diameter, it will become apparent from the discussion hereinbelow that it is contemplated that cylinders having different diameters from one another may be used advantageously in certain situations. Also, it is contemplated that spacers may be inserted between the cylinders to extend the reach of the cylinders for desired distances.

Figure 2:
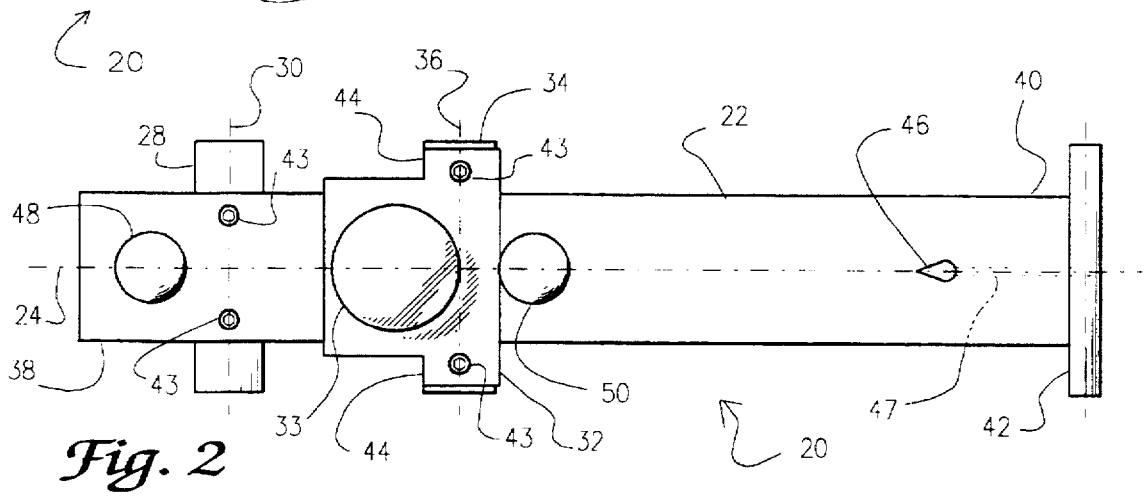
FIG. 2 is a plan view of the feature dimension transfer tool illustrated in FIG. 1.

Referring now to FIG. 2, where it is shown that in a highly preferred embodiment of the feature dimension transfer tool 20 the longitudinal body 22 includes a first end 38 and a second end 40 which is opposite the first end 38. In this embodiment the first cylinder 28 is fixedly attached to the longitudinal body 22 at a position on the flat surface 26 near the first end 38 of the longitudinal body 22. It is contemplated that the attachment of the first cylinder 28 to the longitudinal body 22 may be accomplished by means of a slideable carriage that is similar to the slideable carriage 32 which supports the second cylinder 34. However, in the interest of simplicity, it is preferred that the first cylinder 28 be attached directly to the flat surface 26 of the longitudinal body 22 by means of a pair of dowel pins or allen screws 43.

Figure 3:
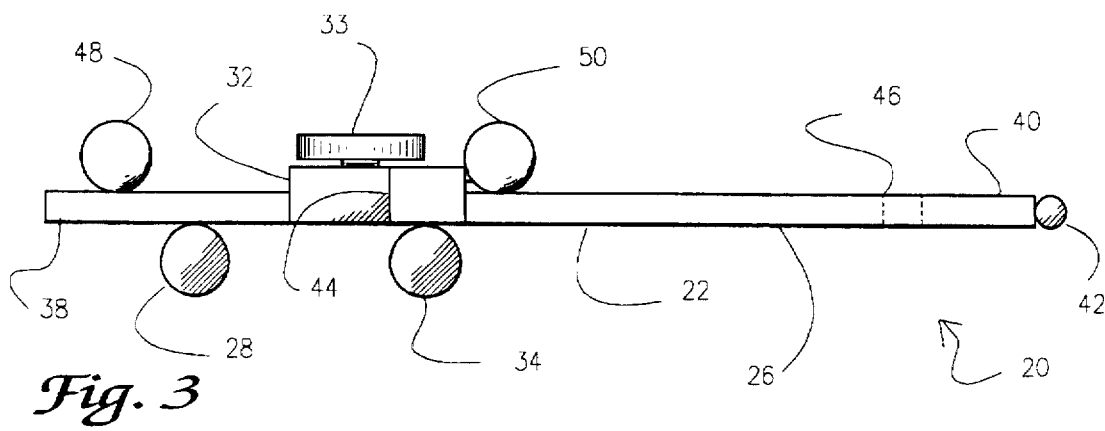
FIG. 3 is a side view of the feature dimension transfer tool illustrated in FIG. 2.

In a highly preferred embodiment illustrated in FIG. 3 the surface of first cylinder 28 is tangent to the flat surface 26 of the longitudinal body 22. Similarly, the surface of the second cylinder 34 is tangent to the flat surface 26 of the longitudinal body 22. Since it is necessary to adjust the distance between the first cylinder 28 and the second cylinder 34, it is highly preferred that the second cylinder 34 be fixedly attached to the carriage 32 by means of at least two allen screws 43. The sliding of the carriage 32 on the longitudinal body 22 may be established by means of a groove shaped track or other similar feature which has not been shown for clarity.

As illustrated in FIGS. 2 and 3, is a third cylinder 42, which is substantially parallel to the first cylinder 28 and the second cylinder 34. This third cylinder 42 is preferably mounted on the second end 40 of the longitudinal body 22, and as explained below will serve in making depth measurements with the instant invention. The third cylinder 42 is preferably attached to the second end 40 of the longitudinal body 22 by means of at least two allen screws in a position that results in the surface of the third cylinder 42 being tangent to the flat surface 26 of the longitudinal body 22.

As shown on FIGS. 1 through 3, the carriage 32 includes a measuring flat surface 44 that is substantially tangent to the surface of the second cylinder 34. In a preferred embodiment this measuring flat surface 44 is perpendicular to the flat surface 26 of the longitudinal body 22. This arrangement is particularly useful for making depth measurements with the feature dimension transfer tool 20. Since the measuring flat surface 44 is substantially parallel to the third cylinder 42, and the first cylinder 28 and the second cylinder 34 are tangent to the flat surface 26 but on the opposite side of the plane of flat surface 26 as is the third cylinder 42. A measurement of the depth of a feature taken between the third cylinder 42 and the second cylinder 34 could lead to an erroneous measurement due to the fact that these cylinders are on opposite sides of the plane of the flat surface 26. Thus, to obviate this problem, the measuring flat surface 44 on the carriage 32 allows the user to accurately arrive at the depth of a surface being measured along the flat surface 26 by measuring the distance between the third cylinder 42 and the measuring flat surface 44 of the carriage 32.

Turning now to FIG. 2, it can seen that the longitudinal body 22 of the feature dimension transfer tool 20 further includes a teardrop shaped aperture, which serves as an attachment means 46. The attachment means 46 serves as a means for accepting a measuring tool such as a dial indicator or for attaching the feature dimension transfer tool 20 to a tooling pin, for example, in order to gage distances relative to the tooling pin. The attachment means 46 shown is teardrop in shape to accept different diameter pins or other tools. The aperture includes a threaded passage 47 for accepting a set screw which can be used to hold items within the attachment means.

Also shown on FIGS. 2 and 3 is that the feature dimension transfer tool 20 will preferably also include a first sphere 48 mounted on the longitudinal body 22 at a location opposite to the flat surface on the longitudinal body 22. This first sphere is preferably attached to the longitudinal body 22 such that the surface of the first sphere 48 is tangent to the surface of the longitudinal body 22. Additionally, it is preferred that a second sphere 50 be mounted on the carriage 32 at a position opposite the flat surface 26 of the longitudinal body 22. The center point of the first sphere 48 and the center point of the second sphere 50 should lie on a single plane which is parallel to the flat surface 26 of the longitudinal body 22.

Figure 4:
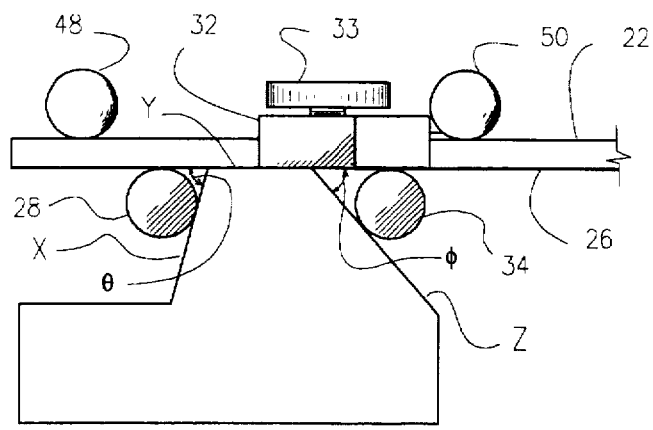
FIG. 4 is a side view of a feature dimension transfer tool being used to measure a feature between two surfaces which are not necessarily parallel to one another.

An example of the versatility of the feature dimension transfer tool 20 can be readily understood by referring to FIG. 4, where the dimension of surface Y, which lies between surfaces X and Z is to be determined. Surface X is at a known angle θ to surface Y, and surface Z is at known angle φ to surface Y.

The measuring procedure begins by placing the flat surface 26 of the feature dimension transfer tool 20 directly on the surface Y. Then the first cylinder 28 is brought to bear against surface X, and the second cylinder 34 is brought to bear against surface Z by loosening the locking wheel 33 on the carriage 32 and sliding the carriage 32 along the longitudinal body 22 until the second cylinder 34 bears against surface Z. The locking wheel 33 should then be tightened and the distance between the cylinders measured by means of a micrometer. The dimension of the surface Y may then be calculated by subtracting from the distance between the centers of the cylinders the radius of cylinders divided by the tangent of one half the value of the angle of the surface and the adjacent surface.

In this example, to arrive at the length of the surface Y from a measurement of the distance between the centers of the cylinders one would perform the following calculations:

a. divide the radius of the first cylinder 28 by tangent of one half the measurement of the angle θ;
 b. divide the radius of the second cylinder 34 by tangent of one half the measurement of the angle φ; and
 c. subtract the quantities arrived at in (a) and (b), above, from the distance between the centers of the cylinders.

Thus, it should be understood that the above calculations are allow accurate measurement of a surface that is between any two adjacent surfaces, regardless of whether the adjacent surfaces are at right angles to the surface to be measured. The parallel relationship of the first cylinder 28 and the second cylinder 34 hold the tool normal over the surface to be measured, and obviate the problems of accuracy introduced by the possibility of measuring diagonally over the surface to be measured with devices which rely on spheres or with devices such as calipers which contact the surface to be measured with sharp edged pinchers.

Figure 6:
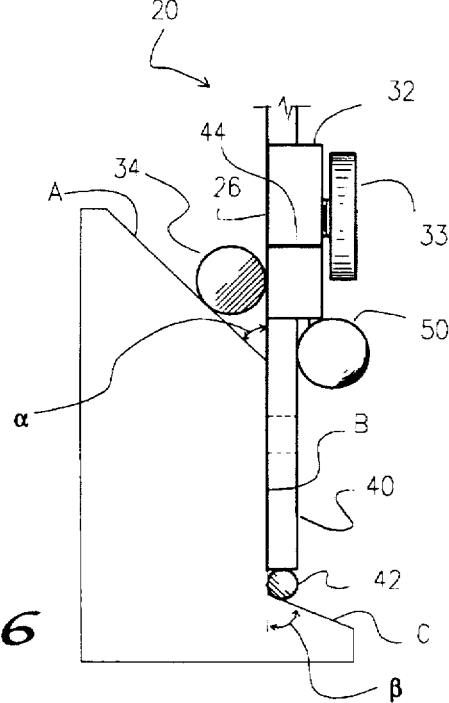
FIG. 6 is a side view of a feature dimension transfer tool being used to measure the depth of a feature.

In addition to the clear advantages in measuring flat surfaces between two surfaces, the ability to measure the depth of a feature with the instant invention is also of importance. Turning now to FIG. 6, it can be seen that by combining a carriage 32 with a measuring flat surface 44 that is tangent to the surface of the second cylinder 34, and by including the third cylinder 42 at the second end 40 of the longitudinal body 22, one can carry out accurate depth measurements of complicated features. Thus as shown on FIG. 6, for example, where the dimension of surface B, which is between surface A and surface C. Surface A and surface C need not be at right angles to surface B, but the angle of surface A relative to surface B, referred to as α, and of surface B relative to surface C, referred to as β, are known. Thus, to measure the depth of surface B one would simply rest the flat surface 26 of the longitudinal body 22 against surface B, with the third cylinder 42 resting against surface C. The carriage 32 would then be adjusted along the longitudinal body 22 so that the second cylinder 34 is tangent to surface A. The locking wheel 33 would then be used to set the position of the carriage 32 relative to the longitudinal body 22.

With the carriage 32 set, one may calculate the length of surface B by the following steps:

i) deter mining the distance between the center of the second cylinder 34 and the center of third cylinder and
 ii) subtracting from the value determined in (i) the result of dividing the radius of the second cylinder 34 by the tangent of one half the measure of angle α and then iii) adding to the value determined in (ii) the result of dividing the radius of the third cylinder 42 by the tangent of one half the measure of angle β.

Thus it can be appreciated that by incorporating the measuring flat surface 44 which is perpendicular to the flat surface 26 of the longitudinal body 22 one can facilitate the determination of the distance between the second cylinder 34 and the third cylinder 42, since this surface serves as a good measurement point for measuring the distance between the second cylinder 34 and the third cylinder 42 with a micrometer. However, it is contemplated that the above calculations may be automated by incorporating a digital readout that can be programmed to carry out the above calculations based on the position of the carriage 32 along the longitudinal body 22, the diameters of the cylinders used with the invention, and then entering the angles or profiles of the surfaces that are adjacent to the surface to be measured.

Figure 5:
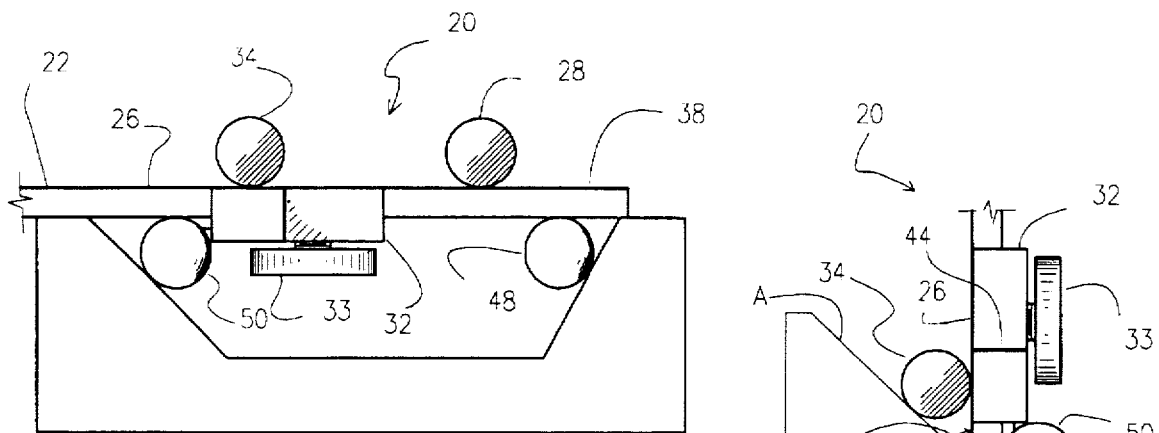
FIG. 5 is a side view of another example of a feature dimension transfer tool being used to measure a feature between two surfaces which are not necessarily parallel to one another and which may represent a long groove or a conical bore.
Figure 7:
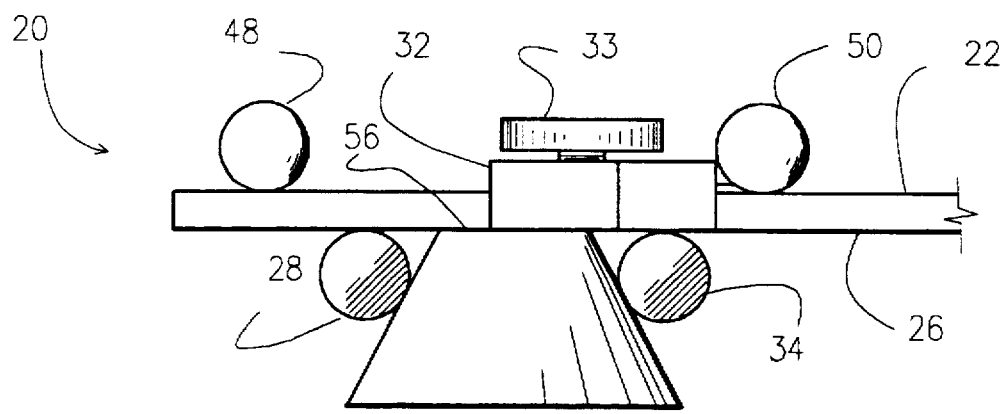
FIG. 7 illustrates the use of a feature dimension transfer tool being used to measure a conical surface.
Figure 8:
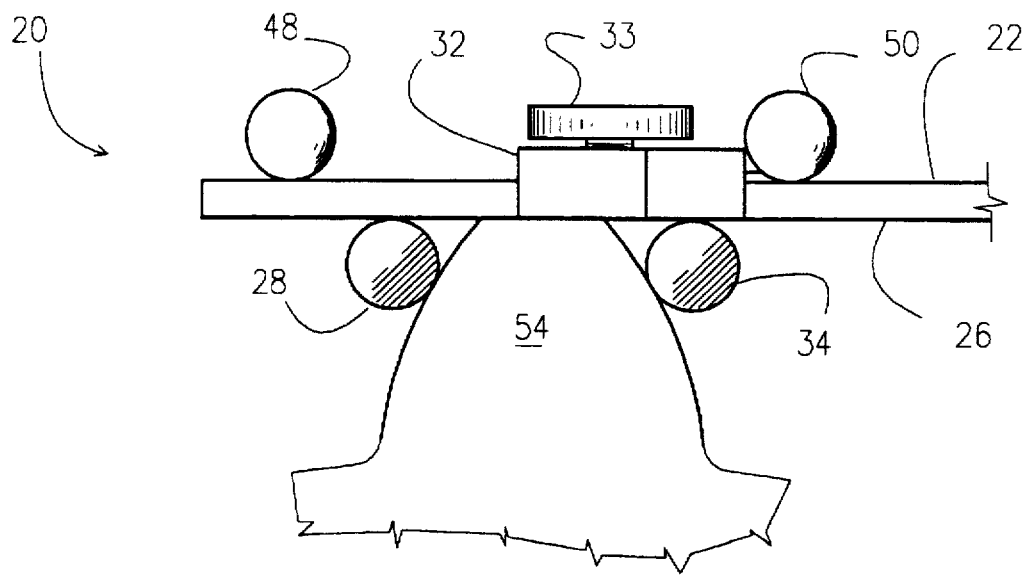
FIG. 8 illustrates the use of a feature dimension transfer tool being used to measure the surface at the end of an involute gear tooth, or the with of the gear tooth at a distance from the top of the gear.

Referring now to FIGS. 5, 7, and 8 where it is illustrated how, with the described feature dimension transfer tool 20 one may accomplish several tasks with a single tool. For example, as may be appreciated from FIG. 5, one may use the instant invention in order to fabricate a conical roller bearing housing, which has an inner race with a conical bore within a cylindrical outer sleeve. Thus, with the feature dimension transfer tool 20 one may accurately monitor the size of the cylindrical outer sleeve by measuring the cylindrical outer sleeve between the first cylinder 28 and the second cylinder 34. Then the size of the conical inner race may be gaged by placing the first sphere and second sphere within the conical bore in the manner shown on FIG. 5. It should be noted that while FIG. 5 has been discussed as being a section through a conical bore, it may also represent a section through a keyway or milled section with converging sides.

It is important to note that the second sphere 50 has been mounted on the carriage 32 at a position on the carriage nearest the second end 40 of the longitudinal body 22. This arrangement will allow the user to lay the longitudinal body 22 across the entrance of a conical bore, as shown on FIG. 5, and then adjust the spheres so that an accurate measurement of the diameter of the conical bore may be made at a desired distance from the entrance of the conical bore. Thus it is contemplated that the first sphere 48 and the second sphere 50 be removably attached to the feature dimension transfer tool 20, so that one may vary the diameter of the spheres used with feature dimension transfer tool 20 by changing the diameter of the spheres used. This would allow the user to take accurate measurements of the diameter of the conical bore at different distances from the entrance of the conical bore since the different diameter spheres will reach into different depths of the conical bore. Clearly, this same result could be achieved by providing several feature dimension transfer tools 20, each having spheres of a desired size.

Moreover, one may accurately measure the taper of the surface of a cone by changing the diameter of the first cylinder 28 and the diameter of the second cylinder 34 by replacing these cylinders or by using several feature dimension transfer tools 20, each tool including cylinders of a desired size. Therefore, as shown on FIG. 7, to measure the taper of the surface of a cone on would lay the flat surface 26 of the longitudinal body 22 over the plateau 56 at the top of the cone and measure the dimension of the surface of the cone at a distance from the flat surface 26 of the longitudinal body 26. The distance from the flat surface 26 being a function of the diameter of the first cylinder 28 and second cylinder 34 of the tool being used. Then, one would simply select a second tool with cylinders of a different size from the tool just used and take a second measurement. With these two measurements one may accurately determine the taper of the cone's surface.

It should be noted that an alternative method may be employed to measure the taper on a cone. This method one would first set the flat surface 26 of the longitudinal body 22 over the plateau 56 of the cone and bring the first cylinder 28 and the second cylinder into contact with the surface of the cone and sets the cylinders at this position. One would then substitute the cone with a cylindrical gage that just fits between the cylinders of the feature dimension transfer tool 20. One would then attach a dial indicator to the feature dimension transfer tool 20 by means of the attachment means 46, and zero the dial indicator against the surface of the gage cylinder by sliding the gage cylinder along the gap between the two cylinders of the feature dimension transfer tool 20. One would then use this setup by removing the gage cylinder and replacing it with the cone to be measured, with the plateau of the cone pressed against the flat surface 26 of the longitudinal body 22. One would then slide the cone along the gap between the cylinders of the feature dimension transfer tool 20, keeping the plateau of the cone flush against the flat surface 26. This motion will produce a reading on the dial indicator that corresponds to the change in diameter of the cone.

Also, it is important to note that with the instant invention it is not necessary that the surfaces adjacent to the surface to be measured be flat. For example, as shown on FIG. 8 the surface to measured is the flat portion at the end of a gear tooth 54. Since the profile of the gear tooth 54 is known, the point of intersection of the surface of the addendum of the gear tooth 54 and the flat surface to be measured can be calculated once the distance between the point of contact of the first cylinder 28 and the gear surface and the point of contact of the second cylinder 34 and the gear surface is measured. Clearly, this same method can be used to determine the width of a flat surface between two rounded surfaces, or a flat surface produced by cutting a cylinder along a chord of the cylinder's cross section.

It should be noted that the fact that one needs to know the angle of the surfaces that are adjacent to the surface to be measured in order to carry out the calculations described above is not a significant drawback to the accuracy of the measurements derived by using the tool, since the angle of adjacent surfaces may be accurately measured with the instant invention by taking measurements of the adjacent surfaces and varying the size of the spheres used to take these measurements as described earlier.

Thus it can be appreciated that another aspect of the invention includes a method for measuring a feature on a machined article, the feature being between an adjacent first surface and an adjacent second surface, the method including the following steps:

a) providing a dimension measuring tool that includes: the longitudinal body 22 having a longitudinal axis 23, a first end 38, a second end 40, and a flat surface 26; the first cylinder 28, having a longitudinal axis 30, and being attached next to the first end of 38 the longitudinal body 22 an preferably at a position that is tangent to the flat surface 26 of the longitudinal body 22. The longitudinal axis 30 of the first cylinder 28 being substantially parallel to the flat surface 26 of the longitudinal body 22 and substantially perpendicular to the longitudinal axis 24 of the longitudinal body 22; the carriage 32 being slideably mounted on the longitudinal body 22; a second cylinder 34 having a longitudinal axis 36, the second cylinder 34 being mounted on the carriage 32 and next to the flat surface 26 of the longitudinal body 22, the longitudinal axis 30 of the first cylinder 24 being substantially parallel to the flat surface 26 of the longitudinal body 22 and substantially perpendicular to the longitudinal axis 24 of the longitudinal body 22;

b) placing the flat surface 26 of the longitudinal body 22 over a feature to be measured;

c) contacting the first surface with the first cylinder 28;

d) sliding the carriage 32 on the longitudinal body 22 until the second cylinder 34 is tangent to the second surface; and e) measuring the distance between the first cylinder 28 and the second cylinder 34.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A feature dimension transfer tool comprising:

a longitudinal body having a longitudinal axis and a flat surface;

a first cylinder having a longitudinal axis, said first cylinder being attached directly to the flat surface of the longitudinal body in a tangential manner, the longitudinal axis of said first cylinder being substantially parallel to the flat surface of the longitudinal body and substantially perpendicular to the longitudinal axis of said longitudinal body;

a carriage slideably mounted on said longitudinal body;

a second cylinder having a longitudinal axis, said second cylinder being mounted on said carriage and directly over and in a tangential manner to the flat surface of the longitudinal body, the longitudinal axis of said first cylinder being substantially parallel to the flat surface of the longitudinal body and substantially perpendicular to the longitudinal axis of said longitudinal body.

2. A feature dimension transfer tool according to claim 1 wherein said first cylinder is removably mounted on said longitudinal body.

3. A feature dimension transfer tool according to claim 1 wherein said first cylinder is fixedly attached to said body.

4. A feature dimension transfer tool according to claim 3 wherein said body further comprises a first end approximate to said first cylinder and a second end opposite said first end, and a third cylinder mounted on said second end in a position that is substantially parallel to said second cylinder.

5. A feature dimension transfer tool according to claim 4 where said carriage includes a flat surface that is substantially tangent to said second cylinder.

6. A feature dimension transfer tool according to claim 5 and further comprising attachment means for accepting a measuring tool.

7. A feature dimension transfer tool according to claim 5 and further comprising a first sphere mounted on said longitudinal body at a location opposite the flat surface on said longitudinal body, and a second sphere mounted on said carriage at a position opposite the flat surface on said longitudinal body.

8. A feature dimension transfer tool comprising:

a longitudinal body having a longitudinal axis and a flat surface along the longitudinal body;

a first cylinder having a longitudinal axis, said first cylinder being attached directly to the flat surface of said longitudinal body in a tangential manner with the longitudinal axis of the first cylinder being substantially perpendicular to the longitudinal axis of the longitudinal body;

a carriage slideably mounted on said longitudinal body; and a second cylinder having a longitudinal axis, the second cylinder mounted on said carriage in a position substantially parallel to, and directly over and in a tangential manner to the flat surface of the longitudinal body and with the longitudinal axis of the second cylinder being substantially perpendicular to the longitudinal axis of said longitudinal body.

9. A feature dimension transfer tool according to claim 8 where said carriage includes a flat surface that is substantially tangent to said second cylinder.

10. A feature dimension transfer tool according to claim 9 wherein said body further includes a first end and a second end, and a third cylinder is mounted on said second end.

11. A feature dimension transfer tool according to claim 10 wherein said third cylinder includes a surface that is substantially tangent to the flat surface on said longitudinal body.

12. A feature dimension transfer tool according to claim 10 and further comprising a teardrop shaped aperture near said second end of said longitudinal body.

13. A feature dimension transfer tool according to claim 12 and further comprising a first sphere mounted on said longitudinal body and a second sphere mounted on said carriage.

14. A method for measuring a feature on a machined article, the feature being between a first surface and a second surface, the method comprising:

providing dimension measuring tool having:

a longitudinal body having a longitudinal axis, a first end and a second end, and a flat surface;

a first cylinder having a longitudinal axis, said first cylinder being attached in a tangential manner directly to the flat surface of the longitudinal body and the longitudinal axis of said first cylinder being substantially parallel to the flat surface of the longitudinal body and substantially perpendicular to the longitudinal axis of said longitudinal body;

a carriage slidably mounted on said longitudinal body;

a second cylinder having a longitudinal axis, said second cylinder being mounted on said carriage and directly over and in a tangential manner to the flat surface of the longitudinal body, the longitudinal axis of said first cylinder being substantially parallel to the flat surface of the longitudinal body and substantially perpendicular to the longitudinal axis of said longitudinal body;

placing the flat surface of the longitudinal body over the feature to be measured;

contacting the first surface with the first cylinder;

sliding the carriage on the longitudinal body until the second cylinder is pressed against the second surface; and measuring the distance between the first cylinder and the second cylinder.

* * * * *